United States Patent [19]

Huang

[11] Patent Number: 5,611,263
[45] Date of Patent: Mar. 18, 1997

[54] APPARATUS FOR STABILIZING THE SURFACE OF A FOOD PRODUCT

[76] Inventor: Frank F. Huang, 4332 La Cadena Cir., Yorba Linda, Calif. 92686

[21] Appl. No.: 678,120

[22] Filed: Jul. 11, 1996

Related U.S. Application Data

[63] Continuation of Ser. No. 460,350, Jun. 2, 1995, abandoned.

[51] Int. Cl.⁶ .................................................. A23L 1/025
[52] U.S. Cl. ........................... 99/339; 99/388; 99/443 C; 99/477; 99/516
[58] Field of Search ............................ 99/423, 339, 388, 99/373, 440, 441, 443 R, 443 C, 477, 516, 534; 126/41 B, 41 C

[56] References Cited

U.S. PATENT DOCUMENTS

| | | | |
|---|---|---|---|
| 1,933,404 | 10/1933 | Allen et al. | 198/213 |
| 3,298,303 | 1/1967 | Waller | 99/423 |
| 3,340,794 | 9/1967 | Giuliano | 99/443 |
| 3,472,156 | 10/1969 | Bardeau et al. | 99/423 |
| 3,713,187 | 1/1973 | Quartarone et al. | |
| 3,843,299 | 10/1974 | Bochanov et al. | 425/332 |
| 3,991,665 | 11/1976 | Lang-Ree et al. | 99/441 |
| 4,073,225 | 2/1978 | Lang-Ree | 99/339 |
| 4,103,605 | 8/1978 | Hemborg et al. | 99/345 |
| 4,294,865 | 10/1981 | Coroncos | 99/419 |
| 4,297,942 | 11/1981 | Benson et al. | 99/388 |
| 4,379,356 | 4/1983 | Geissbuhler | 17/45 |
| 4,433,621 | 2/1984 | Van Wyk et al. | 99/388 |
| 4,680,183 | 7/1987 | van Schouwenburg | 426/64 |
| 4,729,898 | 3/1988 | Brule | 426/241 |
| 5,141,762 | 8/1992 | Mally | 426/412 |

*Primary Examiner*—David Scherbel
*Assistant Examiner*—James F. Hook
*Attorney, Agent, or Firm*—John L. Gray

[57] ABSTRACT

An apparatus and method for stabilizing the surface of a food product is disclosed. The apparatus includes a frame, one or two sets of cylindrical rollers in the frame, the sets of rollers being inclined, a mechanism for rotating the rollers, and devices for surface treating the food article. The apparatus optionally may include an enclosure over the frame, and an oil applicator. The devices for surface treating the food article can include a plurality of direct flame applicators, cryogenic liquid gas applicators, impingement hot air applicators, and chemical solution applicators.

20 Claims, 2 Drawing Sheets

5,611,263

APPARATUS FOR STABILIZING THE SURFACE OF A FOOD PRODUCT

This application is a continuation of application Ser. No. 08/460,350 filed Jun. 2, 1995 now abandoned.

BACKGROUND OF THE INVENTION

The invention relates generally to an apparatus for processing food products and, more particularly, to an apparatus for stabilizing the surface of a food product so that further processing of the food product is easily accomplished.

Protein is capable of forming a stable shape by thermal gelation (e.g., cooked eggs), chemically induced coagulation (e.g., tofu), freezing or deep fat frying (e.g., frozen or fried meatballs), or incorporating a hydrocolloid followed by setting with divalent cations (e.g., alginate with calcium ions). When the food material is solid or semi-solid, shape formation can be achieved using special machines, such as a patty machine or a sausage type stuffing machine. With fluid or semi-fluid materials, stabilized forms can be achieved by confining the materials to a mold, container, or package while subjecting the protein-containing material to heating, freezing, or chemical treatment.

Many types of machines are known for producing shaped food products, such as hot dogs, sausages, and meatballs. For example, U.S. Pat. No. 4,379,356, Geissbuhler, discloses an apparatus for making skinless sausages. Tubes are filled with a meat mixture and exposed to a heat source such that the meat is at least partially coagulated. The tubes may be heated by thermal conduction, or microwave heating. Another apparatus for making skinless sausages is shown in U.S. Pat. No. 5,141,762, Mally. Sausage batter is fed into a molding compartment which is surrounded by a heating assembly. Batter passes through the molding compartment and is surface cooked or congealed to form a proteinaceous skin. The batter is then cut into partially shaped products, and further processed. The heating assembly uses thermal conduction to heat the surface of the batter.

Heating oil is used to heat the surface of the apparatus for cooking meatballs shown in U.S. Pat. Nos. 4,073,225, Lang-Ree and 4,103,605, Hemborg et al. Internal heating elements are used to heat the surface of the rollers used to cook the meatballs in U.S. Pat. No. 3,991,665, Lang-Ree et al.

Other methods of processing such food materials include using infrared radiation to stabilize the surface of the food product, as is shown in U.S. Pat. No. 4,729,898, Brule, and U.S. Pat. No. 4,680,183, van Schouwenburg.

However, the use of thermal conduction and infrared radiation for stabilizing the surface of proteinaceous material is not energy efficient.

Some types of proteinaceous materials are difficult to process. For example, vegetable protein materials are particularly difficult to process due to the nature of the protein which does not provide sufficient binding in the raw state and the lack of rendering upon cooking. Typically, deep fat frying is necessary for mass production. However, this makes it difficult to produce a low-fat vegetarian food product.

Therefore, it is an object of the present invention to provide an energy efficient apparatus for stabilizing the surface of proteinaceous food products to allow subsequent handling or processing.

It is a further object of the present invention to provide an apparatus for producing shaped food products with little or no fat in the final product.

These, together with other objects and advantages of the invention will become more readily apparent to those skilled in the art when the following general statements and descriptions are read in the light of the appended drawings.

SUMMARY OF THE INVENTION

An apparatus for stabilizing the surface of a food product is disclosed. The apparatus comprises a frame, a first set of cylindrical rollers in the frame, the first set having at least two rollers, each roller having a first end and a second end, and the first set being inclined such that the first end of the roller is higher than the second end, means for rotating the rollers, and means for surface treating the food article. The apparatus may include a second set of rollers in the frame, the second set having at least two rollers, each roller having an upper and a lower end, and the second set being inclined such that the upper end of the roller is higher than the lower end, the upper end of the second set of rollers being located adjacent to the second end of the first set, and a means for rotating the second set of rollers. It preferably also includes a transfer plate between the first and second sets of rollers. The apparatus optionally may include an enclosure over the frame, and an edible lubricant applicator.

The means for surface treating the food article preferably comprises a plurality of direct flame applicators, a plurality of cryogenic liquid gas applicators, a plurality of impingement hot air applicators, or a plurality of chemical solution applicators. The cryogenic liquid gas applicators preferably include either a source of liquid nitrogen or a source of liquid carbon dioxide.

The angle of inclination for the first set of rollers relative to horizontal is preferably in the range of 2° to 25°, and most preferably in the range of 5° to 20°. The angle of inclination for the second set of rollers relative to horizontal is preferably in the range of 2° to 15°, and most preferably is in the range of 5° to 10°.

The first and second sets of rollers are preferably rotated at a speed of about 10 to 60 rpm, and most preferably, at a speed of about 20 to 40 rpm.

A method of treating a food product is also disclosed. The method includes the steps of placing the food product on a set of rollers, rotating the set of rollers, and applying a surface treatment to the surface of the food product whereby the surface of the food product is stabilized so that further processing of the food product can be accomplished. The surface treatment preferably includes the use of direct flame, cryogenic liquid gas, impingement hot air, or a chemical solution. The method can also include the step of coating the food product with an edible lubricant.

DETAILED DESCRIPTION OF THE INVENTION

Figure 1:
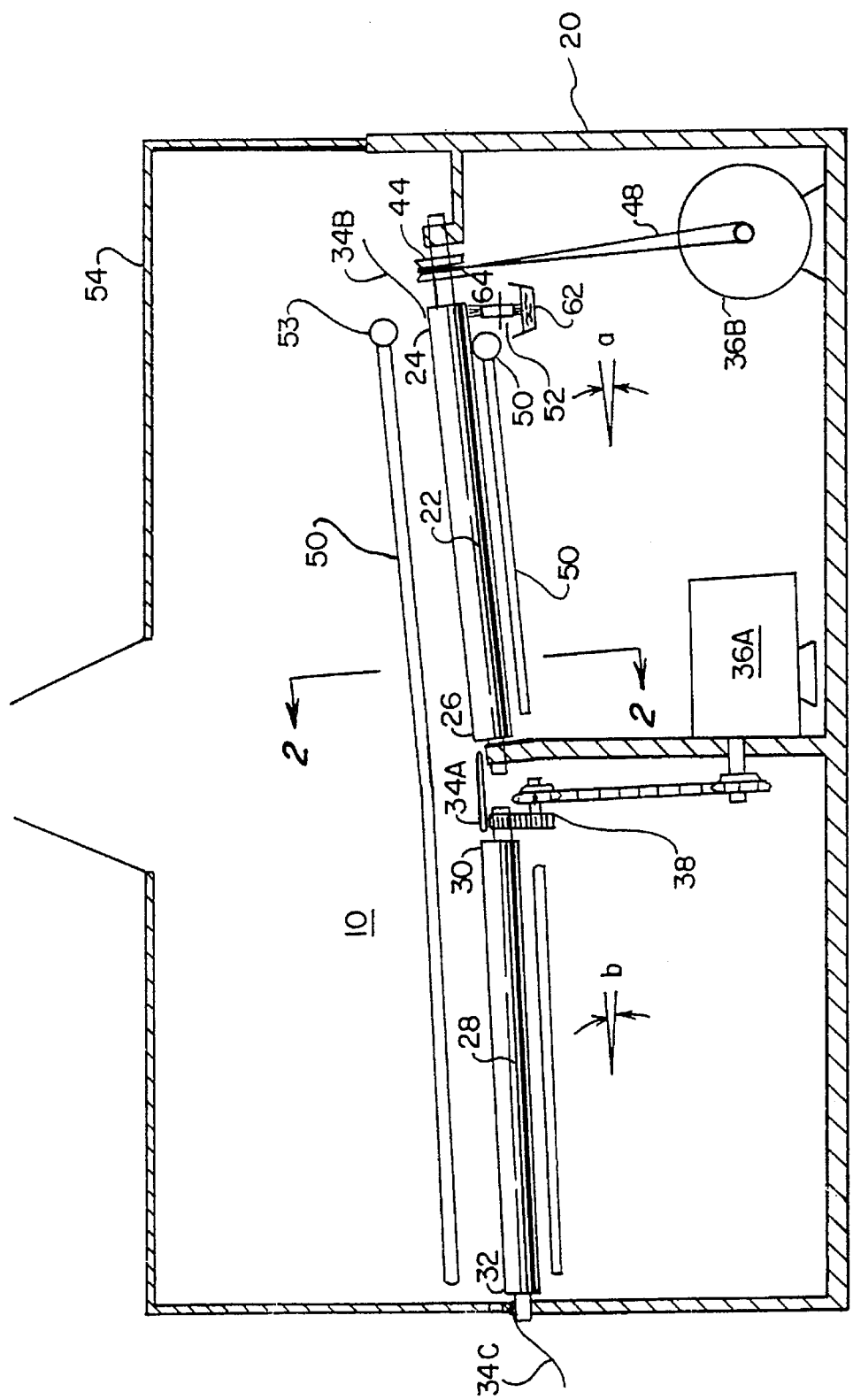
FIG. 1 shows a side view of the apparatus of the present invention.

The apparatus of the present invention allows surface treatment of the surface of a shaped food product. A meatball will be discussed as an example of a shaped food article to be processed on this apparatus, but as is readily apparent, any spherical or rounded food product could be used.

A meatball is formed in a ball forming machine, not shown. Any commercially available machine could be used, such as for example, machines made by Bridge Machine Co., Hollymatic Corp., NuTEC Manufacturing, Inc., and Koppens Industries. The meatball is introduced into the apparatus 10 shown in FIG. 1.

Apparatus 10 includes frame 20. A first set of rollers 22, each roller having a first end 24 and a second end 26, are attached to the frame 20. The first set of rollers are inclined such that first end 24, where the meatball is introduced, is higher than second end 26. The angle of inclination a, relative to horizontal, is in the range of 2° to 25°, and preferably is in the range of 5° to 20°. The rollers can be made of any suitable material, such as stainless steel, plastic, or non-stick coated rolls.

Figure 2:
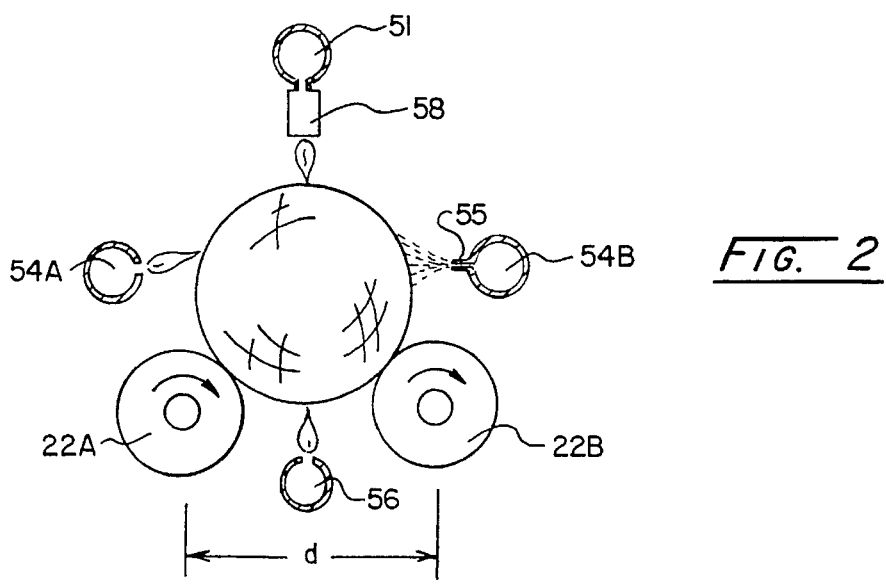
FIG. 2 shows a cross section of the rollers, the plane of which is shown by the line 2—2 of FIG. 1.

FIG. 2 shows a cross section of two rollers 22A and 22B. The rollers are preferably about 0.625 inches in diameter, but they could be bigger or smaller depending on the product being processed. For a 1.0 inch diameter meatball, the distance between the rollers d is preferably about 1.25 inches (center to center), and for a 1.5 inch diameter meatball, they are preferably located about 1.5 inches apart. The appropriate distance d will vary depending on the size of the meatball and the particular protein product being processed.

The apparatus preferably includes a second set of rollers 28, each roller having an upper end 30 and a lower end 32. The second set of rollers are inclined such that upper end 30 is higher than lower end 32. The angle of inclination b, relative to horizontal, is in the range of 2° to 15°, preferably in the range of 5° to 10°. The second set of rollers is located adjacent the first set.

Each set of rollers has at least two rollers. However, more than two rollers are preferably used. The larger the number of rollers, the larger the number of meatballs that can be processed simultaneously.

When two sets of rollers are used, a transfer plate 34A is preferably installed between the two. Transfer plates 34B and 34C may also be installed at the product entrance and exit. The transfer plates are preferably made of stainless steel, and are preferably about two inches wide with a concave groove in the center. The length and curvature for the transfer plates may vary according to needs.

Figure 3:
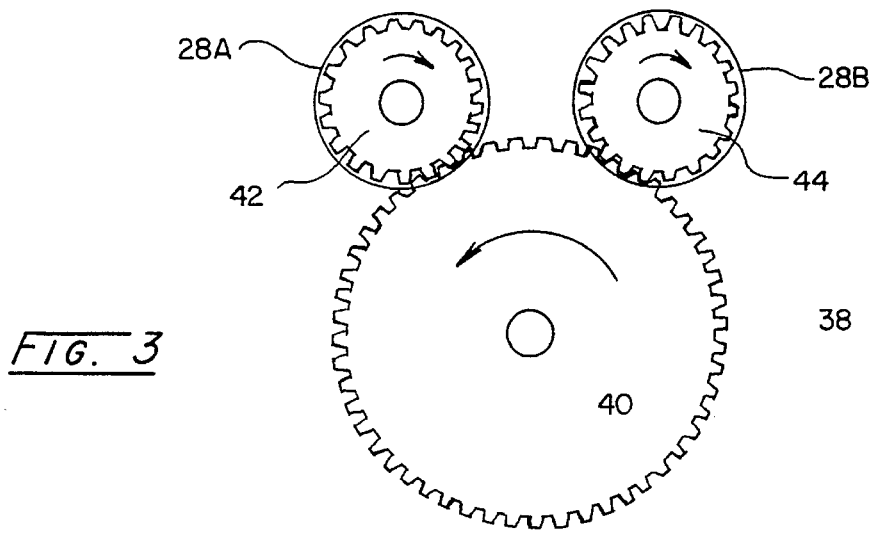
FIG. 3 shows a drive mechanism using gears to drive the roller sets.
Figure 4:
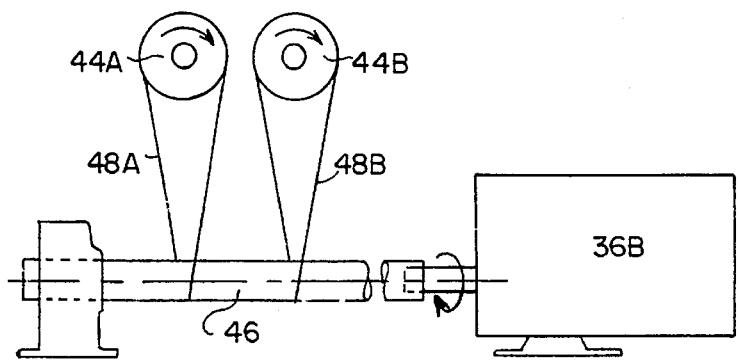
FIG. 4 shows an alternate drive mechanism using belts to drive the roller sets.

The two sets of rollers are rotated at low speed. The speed of the rollers should be approximately 10 to 60 rpm, and preferably 20 to 40 rpm. The rollers can rotate either clockwise or counterclockwise. The best effect occurs when the rollers in a set rotate in the same direction. The rollers can be rotated using a variable speed drive motor 36A to drive a series of gears 38. FIG. 3 shows a possible gear arrangement. Transmitting gear 40 turns gears 42 and 44, which are connected to rollers 28A and 28B, respectively. Another possible drive mechanism is shown in FIG. 4. Variable speed drive motor 36B drives rod 46. Belts 48A and 48B connect pulleys 44A and 44B to driving rod 46. The rotation of driving rod 46 causes rollers 22A and 22B to turn. Other drive arrangements could be used, such as friction wheels and chain links. The same drive system could be used for both sets of rollers, or a separate one could be used for each set, as is illustrated in FIG. 1. When a flexible union (e.g., a universal joint) is used to connect the two sets of rollers, only one drive system is needed.

The inclination of the roller sets and the rotation of the rollers cause the meatballs to rotate while they move down the rollers. The meatballs are subjected to surface treatment as they move down the rollers. As shown in FIG. 1, the meatballs are subjected to a plurality of direct flame applicators 50. As shown in FIG. 2, the applicators can be located above, below, and to the side of rollers 22A and 22B: applicators 51, 56, and 54A and 54B, respectively.

In the case of direct flame application, natural or propane gas is pre-mixed with a controlled amount of air using a gas-air mixer (not shown) prior to sending it through a feeder line 53 into the applicator 50, as shown in FIG. 1. The applicator is constructed with a pipe, on which 0.05 inch to 0.2 inch diameter holes are drilled along the length at about 1 inch apart. The size and material of the pipe may vary depending on the length of the applicator and other safety and regulatory requirements. Burning tips or nozzles 58 (FIG. 2) may be attached to the pipe in lieu of a gas-air mixer, for a direct flame applicator. The holes or nozzles are drilled or installed in a manner such that the burning flame coming out of the holes/nozzles will aim directly toward the meatballs to be treated.

For impingement hot air, chemical solution, or cryogenic liquid gas applicators, there is no need for a pre-mixer or gas burning nozzles. However, short tubes 55 with various openings may be attached to the pipe to target hot air, solution, or liquid gas application only on the desired surface area of the meatballs.

The direct flame or impingement hot air applicators provide a burning flame or a high velocity, intense heat at the surface of the balls, causing a thin layer of the protein to denature and form a stabilized skin on the balls. However, no significant burning of the surface or cooking of the protein material inside the stabilized skin occurs with the use of direct flame or impingement hot air. Therefore, less energy is needed to remove the heat during subsequent freezing or cooling procedures. Proteinaceous material treated with surface treatment will be able to withstand handling that would have been impossible without treatment.

Meatballs may also be treated by using a plurality of chemical solution applicators spraying solutions containing agents that can chemically denature the protein or render the food material stable. Examples of the applicable agents include edible acids and divalent cations. Edible acids, such as acetic, citric, phosphoric and hydrochloric acid, in adequate concentrations may be sprayed on the meatballs to form a stabilized surface. Meatballs formulated with gums, such as, alginate, may become congealed when coming in contact with solutions containing calcium or magnesium ions.

The food products could also be subjected to a plurality of cryogenic liquid gas applicators. The cryogenic liquid gas applicators preferably include either a source of liquid nitrogen or a source of liquid carbon dioxide. The liquid nitrogen or carbon dioxide is sprayed onto the surface of the meatball, causing a thin layer of the food material to freeze, providing stability for handling and further processing.

The apparatus can include an edible lubricant applicator 52. The edible lubricant applicator 52 either sprays or transfers the lubricant (e.g., vegetable oil) from a holding pan 62 by means of a rotating brush 64 onto the rollers, creating a thin coating of edible lubricant on the surface of the meatball to facilitate mechanical transfer. In this way, a low fat product may be produced. When a frozen meatball is to be produced, this oil coating is not necessary.

The apparatus may also include an enclosure 54. The enclosure 54 fits on top of the frame to enclose the apparatus. It may completely cover the apparatus or it may be in the nature of a hood located above the frame. It can include an exhaust hood so vapors and the like can be removed from the area of the apparatus. The enclosure 54 can be made of any suitable material, such as stainless steel.

After surface treatment, the stabilized meatball can be further processed. It could be oven baked, frozen, dehydrated, deep fat fried, or otherwise cooked. The cryogenic liquid gas treated meatballs are suitable for further freezing or deep fat frying.

The apparatus can be used to process all proteinaceous material, such as meat or vegetable protein. After surface treatment, a ball-shaped food product can maintain its shape during further processing.

While a preferred form of the invention has been shown in the drawings and described, since variations in the preferred form will be apparent to those skilled in the art, the invention should not be construed as limited to the specific form shown and described, but instead is as set forth in the following claims.

What is claimed is:

1. An apparatus for stabilizing the surface of a spherical food product comprising:

a frame;

a first set of cylindrical rollers in the frame of a size and spaced from each other a sufficient distances so as to support said food product, but also to permit the application of direct flame to the entire surface of said food product from the space between said rollers and underneath said food product as well as concurrently on the top and sides of said food product, the first set having at least two rollers, each roller having a first end and a second end, and the first set being inclined such that the first end is sufficiently higher than the second end so as to permit said food product to roll down said rollers from said first end to said second end;

means for rotating the rollers; and means for surface treating the food article including a pluraltiy of direct flame applicators so positioned that said flames will impinge directly onto the entire surface of said food product while said food product rolls down said rollers.

2. The apparatus of claim 1 further comprising a second set of rollers in the frame, the second set having at least two rollers, each roller having an upper and a lower end, and the second set being inclined such that the upper end is higher than the lower end, the upper end of second set of rollers being located adjacent to the second end of the first set, and a means for rotating the second set of rollers.

3. The apparatus of claim 2 further comprising a transfer plate between the first and second sets of rollers.

4. The apparatus of claim 1 further comprising an enclosure over the frame.

5. The apparatus of claim 1 further comprising an edible lubricant applicator.

6. The apparatus of claim 1 wherein the means for surface treating the food article comprises a plurality of cryogenic liquid gas applicators.

7. The apparatus of claim 6 wherein the means for surface treating the food article includes a source of liquid nitrogen.

8. The apparatus of claim 6 wherein the means for surface treating the food article includes a source of liquid carbon dioxide.

9. The apparatus of claim 1 wherein the means for surface treating the food article comprises a plurality of impingement hot air applicators.

10. The apparatus of claim 1 wherein the means for surface treating the food article comprises a plurality of chemical solution applicators.

11. The apparatus of claim 1 wherein the angle of inclination for the first set of rollers relative to horizontal is in the range of 2° to 25°.

12. The apparatus of claim 11 wherein the angle of inclination for the first set of rollers is in the range of 5° to 20°.

13. The apparatus of claim 2 wherein the angle of inclination for the second set of rollers relative to horizontal is in the range of 2° to 15°.

14. The apparatus of claim 13 wherein the angle of inclination for the second set of rollers relative to horizontal is in the range of 5° to. 10°.

15. The apparatus of claim 1 wherein the first set of rollers is rotated at a speed of about 10 to 60 rpm.

16. The apparatus of claim 15 wherein the first set of rollers is rotated at a speed of about 20 to 40 rpm.

17. The apparatus of claim 2 wherein the second set of rollers is rotated at a speed of about 10 to 60 rpm.

18. The apparatus of claim 17 wherein the second set of rollers is rotated at a speed of about 20 to 40 rpm.

19. The apparatus of claim 1 wherein the first set of rollers is rotated in the same direction.

20. The apparatus of claim 2 wherein the second set of rollers is rotated in the same direction.

* * * * *